(12) United States Patent
Butler

(10) Patent No.: US 6,721,909 B2
(45) Date of Patent: Apr. 13, 2004

(54) HIGH DYNAMIC RANGE ERROR RATE MONITOR

(75) Inventor: Graham Butler, Nottingham (GB)

(73) Assignee: Marconi Communications Limited, Coventry (GB)

( * ) Notice: Subject to any disclaimer, the term of this patent is extended or adjusted under 35 U.S.C. 154(b) by 311 days.

(21) Appl. No.: 09/731,243

(22) Filed: Dec. 6, 2000

(65) Prior Publication Data

US 2001/0021986 A1 Sep. 13, 2001

(30) Foreign Application Priority Data

Dec. 11, 1999 (GB) .............................. 9929250

(51) Int. Cl.⁷ ................................ G06F 11/00
(52) U.S. Cl. ....................................... 714/704
(58) Field of Search ................. 714/704–703; 370/224; 375/225

(56) References Cited

U.S. PATENT DOCUMENTS

| 4,363,123 A | * | 12/1982 | Grover | ....................... 714/706 |
|---|---|---|---|---|
| 4,385,383 A | * | 5/1983 | Karchevski | ................. 714/706 |
| 4,490,817 A | * | 12/1984 | Turner | ........................ 370/244 |
| 4,800,562 A | * | 1/1989 | Hicks | .......................... 714/704 |

FOREIGN PATENT DOCUMENTS

| GB | 0286744 A1 | * 10/1998 | ............. H04J/3/00 |
|---|---|---|---|
| GB | 2 329 559 A | 3/1999 | |

* cited by examiner

Primary Examiner—Albert Decady
Assistant Examiner—Shelly A Chase
(74) Attorney, Agent, or Firm—Kirschstein, et al.

(57) ABSTRACT

There is provided an error rate monitor (10) incorporating a counter (30) which is incremented as errors are detected in a data stream passing through an interface unit (20) connected to the counter (30). The counter (30) is also simultaneously decremented at a rate proportional to an exponential of a value presently stored in the counter (30). The monitor (10) thereby provides from the value stored in the counter (30) a measure of error rate in the data stream, the value substantially proportional to a logarithm of error rate in the data stream, thereby providing the monitor (10) with a relatively large error rate monitoring dynamic range.

13 Claims, 3 Drawing Sheets

HIGH DYNAMIC RANGE ERROR RATE MONITOR

BACKGROUND OF THE INVENTION

The present invention relates to an error rate monitor providing a non-linear measurement response.

In conventional digital communication systems comprising data transmission lines, data streams flowing along the lines are often partitioned into fixed-length blocks of data. Each block contains data for transmission together with some additional overhead information. This overhead information can, for example, include a simple parity bit, a more comprehensive bit-interleaved word or a sophisticated coding algorithm, the information being useable for determining an estimated error count for its associated block.

Bit error rate monitoring of the streams in the systems is performed by collating error occurrence records derived from overhead information associated with the streams. Such error rate monitoring is important because data transmission lines of the systems operable to convey data streams are often hired out to customers at a premium rate on the basis of there being low error rates on the lines; customers are often interested to measure error rate to ensure that they are not paying the premium rate unnecessary or to ensure that they can receive a discount if the transmission lines are below standard.

Most conventional digital transmission systems operate at a relatively low bit error rate of less than 1 error in $10^6$ bits in their respective data streams. However, error bit rates of 1 error in $10^4$ bits of data in their respective data streams can be encountered on occasions. It order to monitor such errors, blocks of data are typically partitioned in a range of 100 to 1000 bits in size; this range is kept to a relatively low number of bits in order to reduce system hardware complexity and improve error rate monitoring at high error rates, for example 1 error in $10^4$ bits of data.

In order to obtain acceptable statistical estimates of bit rate error, block errors are counted over a sufficiently large number of blocks to yield a few tens of errors; for 100-bit blocks, an error rate of 1 error in $10^6$ bits corresponds to, on average, one error every 10000 blocks. To obtain a good statistical estimate of current bit error rate, block errors have to be counted over 300000 blocks to yield a few tens of errors.

In practice, digital error rate monitors are needed which are capable of supplying reasonably accurate error estimates over a wide range of error rates from 1 error in $10^4$ bits to 1 error in $10^{10}$ bits. Such a wide range corresponds to a range of one to one million and is far greater than individual conventional error rate monitors and associated detection algorithms can accommodate. Thus, conventional error rate monitors adapted for measuring over such a wide range comprises a set of several monitor units, usually one unit allocated for monitoring a decade range in the overall wide range.

The inventor has appreciated that it is possible to devise an alternative error rate monitor which can accommodate a wide range of error rates without a need for there to be multiple monitor units included therein, thereby reducing cost and complexity of transmission systems incorporating such alternative monitors compared to them including equivalent conventional error rate monitors.

SUMMARY OF THE INVENTION

According to a first aspect of the present invention, there is provided an error rate monitor for measuring rate of error occurrence in a data stream, the monitor characterised in that it includes:

(a) error detecting means for receiving the data stream and analysing it to identify when errors occur therein;

(b) counting means for counting up errors identified by the detecting means to provide a cumulative error count; and (c) decrementing means for decrementing the error count at a rate dependent upon the magnitude of the error count, the decrementing means operable to decrement the error count at a rate which increases more than linearly with respect to increases in the magnitude of the error count, the error count thereby providing an indication of error rate within the data stream.

The invention provides the advantage that the error count increases less than linearly with respect to increasing error occurrence thereby providing the monitor with an enhanced measuring range.

Advantageously, the rate at which the decrementing means decrements the error count increases substantially exponentially with respect to increases in the magnitude of the error count, thereby providing the monitor with a substantially logarithmic response for the error count with respect to error occurrence in the data stream. The substantially logarithmic response provides the benefit of a relatively large dynamic range for the monitor of the invention; conventional monitors typically provide a linear measurement response.

Preferably, the data stream is partitioned into data blocks, each block having associated therewith overhead information useable by the error detecting means for determining error occurrence in the block. Such partitioning enables the counting means and the decrementing means are clocked at a rate depending upon a rate of receipt of data blocks at the error detecting means. The monitor thereby is rendered capable of coping with varying rates of receipt of blocks at the detecting means and therefore determining error rate in the data stream taking such varying rates into account.

In one embodiment of the invention, the detecting means, the counting means and the decrementing means are implemented in the form of processing means executing software. Such an implementation of the monitor is convenient when the monitor is used in communication systems primarily comprising interlinked computer networks.

In another embodiment of the invention implemented in hardware form, the error detecting means conveniently includes an assembly of logic gates operable to detect errors in the data stream, the counting means includes an up/down counter for counting errors detected by the detecting means and for providing a count output, and the decrementing means includes a binary counter and a multiplexer for providing data for use in decrementing the up/down counter depending upon the magnitude of the count output, thereby rendering the count output indicative of error rate in the data stream. Such an implementation of the monitor is relatively simple and can be integrated onto a single integrated circuit. For example, the monitor can be implemented such that the up/down counter is a 4-bit up/down counter, the binary counter is a 16-bit binary counter and the multiplexer is a 16-to-1 multiplexer. When implemented in such a manner, the count output of the up/down counter is preferably connected to address inputs of the multiplexer for selecting count outputs of the binary counter for use in generating the data for use in decrementing the up/down counter.

In a second aspect, the invention provides a communication system including communications paths operable to convey respective data streams, one or more of the paths each including a monitor according to the first aspect of the invention for monitoring error rate along the path. Inclusion of the monitor of the first aspect of the invention enables error rates occurring in the paths to be monitored over potentially a relatively wide range of error rates. The system is advantageously operable to divert data streams away from paths whose associated monitors detect an excess rate or error occurrence; such operation is capable of providing users of the system with more reliable communication.

In a third aspect, the invention provides a method of measuring error occurrence in a data stream using a monitor according to the first aspect of the invention, the method including the steps of:

(a) detecting error occurrence in the data stream;

(b) incrementing a cumulative error count in counting means of the monitor when errors occur in the data stream;

(c) decrementing the error count at a rate dependent upon the magnitude of the error count; and (d) repeating steps (a) to (c) until monitoring of error occurrence is completed, the error count being indicative of a rate of error occurrence in the data stream.

BRIEF DESCRIPTION OF THE DRAWINGS

Embodiments of the invention will now be described, by way of example only, with reference to the following diagrams in which.

DETAILED DESCRIPTION OF THE PREFERRED EMBODIMENTS

Figure 1:
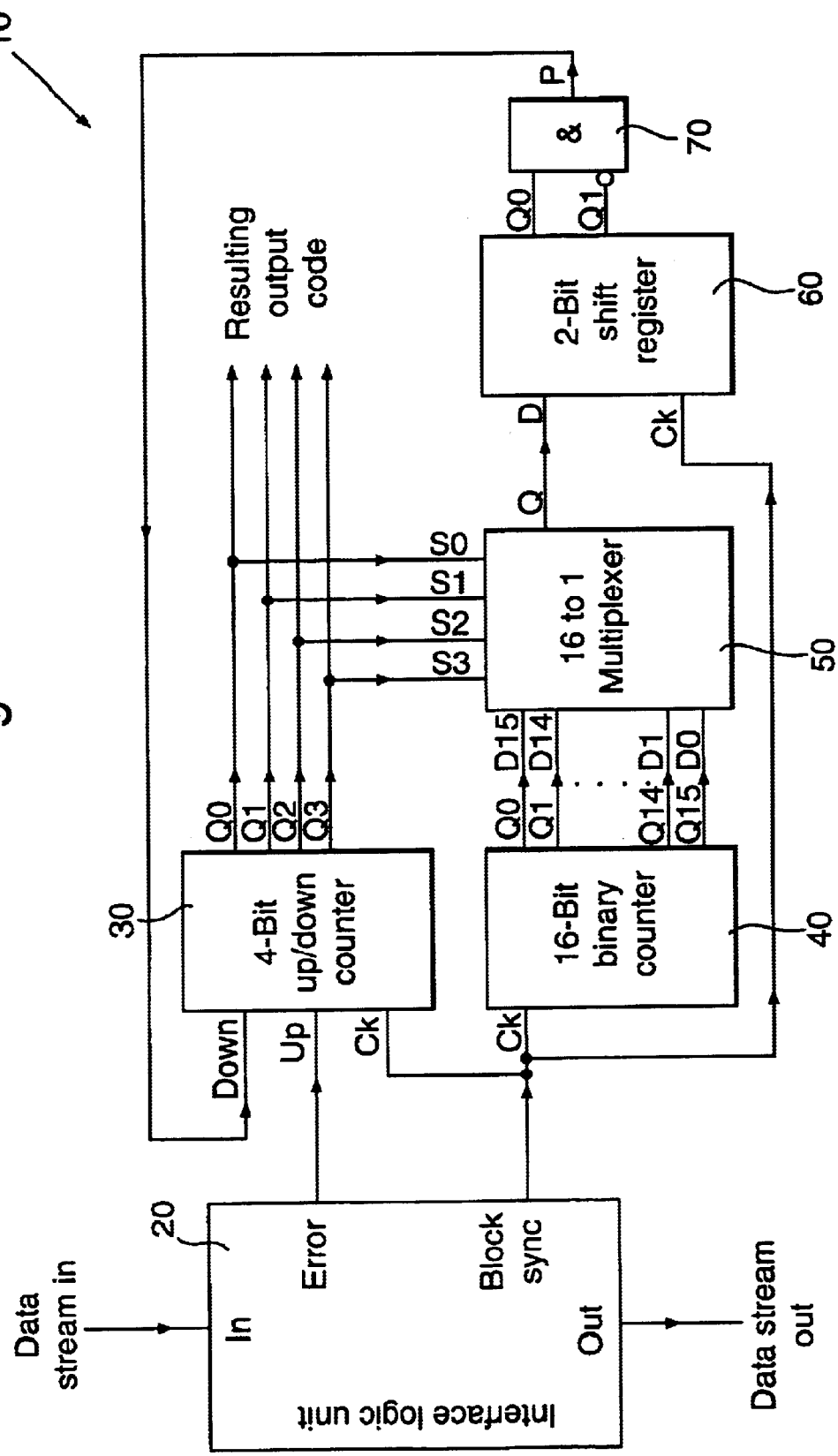
FIG. 1 is a circuit configuration of a first embodiment of the invention.

Referring now to FIG. 1, there is shown a circuit configuration of a simple error rate monitor according to the invention; the circuit configuration is indicated by 10. The configuration 10 is operable to generate a 4-bit error count result, namely a "Resulting Output Code", and has an error counting range of $2^{16}$, namely 4⅔ decades. For larger error counting ranges, the configuration 10 can be adapted to have more working bits to its counters and registers.

The configuration 10 comprises an interface logic unit 20, a 4-bit up/down counter 30, a 16-bit binary counter 40, a 16-to-1 multiplexer 50, a 2-bit shift register 60 and an AND gate 70. The counters 30, 40, the unit 20, the multiplexer 50, the register 80 and the gate 70 are interconnected to form the configuration 10.

The interface unit 20 includes an input IN, an output OUT and two further outputs ERROR and BLOCK SYNC. The input IN is connected to receive a data stream from its associated communication system (not shown) providing the configuration 10 with blocks of data.

Likewise, the output OUT is connected to supply the data stream further back into the system. The output ERROR is connected to an up count input UP of the up/down counter 30, 30. Moreover, the output BLOCK SYNC is connected to respective clock inputs CK of the up/down counter 30, the binary counter 40 and the shift register 60. The interface unit 20 comprises an assembly of interconnected logic gates hardwired to detect errors occurring in the data stream; design of the unit 20 is well known to one ordinarily skilled in the art of logic design.

The interface unit 20 is operable to generate a pulse at its BLOCK SYNC output each time a new block of data is received at the IN input. Moreover, the unit 20 is also operable for each block of data to examine its associated overhead information and compare this information with data in the block to determine parity therebetween. If there is an error of parity, the unit 20 generates a pulse at its ERROR output.

The up/down counter 30 includes four counter outputs Q0 to Q3 where Q0 is a least significant output and Q3 is a most significant output. The outputs Q0 to Q3 provide the 4-bit count result, namely the "Resulting Output Code", indicative of error rate occurrence in the data stream received at the input IN of the interface unit 20.

The outputs Q0 to Q3 are connected to corresponding address inputs S0 to S3 respectively of the multiplexer 50. Moreover, the binary counter 40 includes sixteen outputs Q0 to Q15 which are connected to corresponding inputs D15 to D0 respectively of the multiplexer unit 50; Q0 of the counter 40 is the least significant output and toggles more rapidly than Q15 which is the most significant output. Thus, D15 toggles more rapidly than D0 when the configuration 10 is in operation.

The multiplexer 50 further comprises a multiplexed output Q. The multiplexer 50 is operable to connect the inputs D0 to D15 to Q depending upon an address value provided by the counter 30 to the inputs S0 to S3. For example, when the inputs S0 to S3 are all logic 0 value, the input DO is connected to the output Q. Likewise, when the inputs S0 to S3 are all logic 1 value, the input D15 is connected to the output Q. The output Q is connected to an input D of the shift register 60.

The shift register 60 includes two outputs Q0 and Q1 where Q0 is a least significant output and Q1 is a most significant output. The outputs Q0, Q1 are connected to a first non-inverting input of the AND gate 70 an inverting input of the gate 70 respectively. The gate 70 further comprises an output P, the output P corresponding to P=Q0. [inverted Q1], connected to a down input DOWN of the up/down counter 30.

The up/down counter 30 is operable to count up when a logic 1 value is presented at its UP input and a clocking pulse is applied to its CK clock input. Likewise, it is operable to count down when a logic 1 value is presented at its DOWN input and a clocking pulse is applied to its CK clock input. The up/down counter 30 includes additional logic to inhibit counting when the UP and DOWN inputs are simultaneously at a logic value 1. Moreover, the logic is further operable to inhibit the counter 30 counting beyond a maximum count of 1111 and below a minimum count of 0000.

Operation of the configuration 10 will now be described, after which it will be further described with reference to an analogy of the configuration 10 implemented with water where water flow is analogous to error count within the configuration 10.

In FIG. 1, the configuration 10 in operation counts up in the up/down counter 30 occurrence of errors in the data stream passing through from the input IN to the output OUT of the interface logic unit 20. The up/down counter 30, whilst counting up errors, is also being decremented with time by virtue of operation of the binary counter 40, the multiplexer 50, the register 60 and the gate 70. The up/down counter 30 is decremented at a rate which substantially exponentially increases in proportion to a value stored in the up/down counter as presented as the "Resulting Output Code". As a consequence, the "Resulting Output Code" is substantially proportional to a logarithm of the error rate presented at the ERROR output of the interface logic unit 20. Moreover, the "Resulting Output Code" is also subject to an averaging effect whose time constant effectively shortens as the "Resulting Output Code" value increases.

In effect, the up/down counter 30 functions as an integrator integrating error occurrences in the data stream and the binary counter 40, the multiplexer 50, the shift register 60 and the gate 70 function as a feed-back loop matching a count rate at the DOWN input of the up/down counter 30 with the error count rate at its UP input. Such a relationship can be expressed mathematically by Equation 1 (Eq. 1):

$$R = \int E \, dt - \int P \, dt + k_0 \qquad \text{Eq. 1}$$

where

R=the "Resulting Output Code";

E=error pulses provided to the UP input of the up/down counter 30;

P=a logic output from the gate 70.

$k_0$=a constant corresponding to an initial value of R.

By action of the binary counter 40, the multiplexer 50, the shift register 60 and the gate 70, P is related to the output R from the up/down counter 30 by Equation 2 (Eq. 2):

$$P = k_a e^{k_b R} \qquad \text{Eq. 2}$$

where $k_a$, $k_b$=scaling constants.

Combining Equations 1 and 2 yields Equation 3 (Eq.3):

$$E = dR/dt + k_a e^{k_b R} \qquad \text{Eq. 3}$$

For a steady state situation, $dR/dt = 0$ simplifying Equation 3 to Equation 4 (Eq. 4):

$$R = \left(\frac{1}{k_b}\right) \ln\left(\frac{E}{k_a}\right) \qquad \text{Eq. 4}$$

In Equation 3, presence of the differential term $dR/dt$ means that for higher E values, $dR/dt$ is greater when changes occur corresponding to a shorter configuration 10 measurement time constant. Moreover, Equation 4 illustrates a logarithmic response of the configuration which imparts to it its relatively large dynamic range for measuring errors in the data stream applied to the interface unit 20.

Although Equations 1 to 4 are continuous functions, the configuration 10 provides a 4⅔ decade measuring range subdivided into 16 discrete levels corresponding to four bits of the up/down counter 30.

Operation of the configuration 10 will now be further described with respect to an analogy where the up/down counter 30 is represented by a water bucket. The bucket incorporates a horizontal circular base connected to a peripheral vertical wall of cylindrical form into which a series of holes are included at intervals along a vertical axis intersecting the wall, the holes operable to drain water from the bucket.

Error pulses output from interface unit 20 at its ERROR output correspond to water being poured into an open top aperture of the bucket. When water is poured into bucket, a pool of water collects therein until an upper meniscus of the pool reaches the holes and water commences to discharge through the holes. The holes correspond to an action provided by the binary counter 40, the multiplexer 50, the shift register 60 and the gate 70, the action being to decrement the up/down counter 30.

The meniscus of the pool in the bucket is indicative of water flow rate into the bucket. When water flows at a relatively slow rate into the bucket, water collected therein flows out of holes near a bottom region of the bucket; such a situation corresponds to a relatively low count rate output from the up/down counter 30, for example {S3, S2, S1, S0}={0, 0, 0, 1} resulting in input D1 of the multiplexer 50 and hence output Q14 of the binary counter 40 being selected for generating the output P for decrementing the up/down counter 30. Conversely, when water flows at a relatively fast rate into the bucket, water collected therein flows out of the holes at the bottom region of the bucket and also out of holes higher up in the bucket; such a situation corresponds to a high count rate output from the up/down counter 30, for example {S3, S2, S1, S0}={1, 0, 1, 0} resulting in input D10 of the multiplexer 50 and hence output Q5 of the binary counter 40 being selected for generating the output P for decrementing the up/down counter 30. As the pool of water in the bucket becomes deeper due to increased water flow rate into the bucket, more of the holes in response contribute to discharging water from the bucket.

As a further refinement, the holes in the wall of the bucket can be graded in size so that holes near the bottom region of the bucket are of relatively smaller area and the holes become progressively larger in area towards a top region of the bucket. Indeed, the holes can be arranged to have associated areas which increase in an approximately exponential manner from the bottom region to the top region of the bucket. When such an arrangement of diameters is employed, the meniscus level in the bucket will be at a height substantially proportional to the logarithm of water flow rate into the bucket; effects of water flow turbulence are ignored in the analogy.

Figure 2:
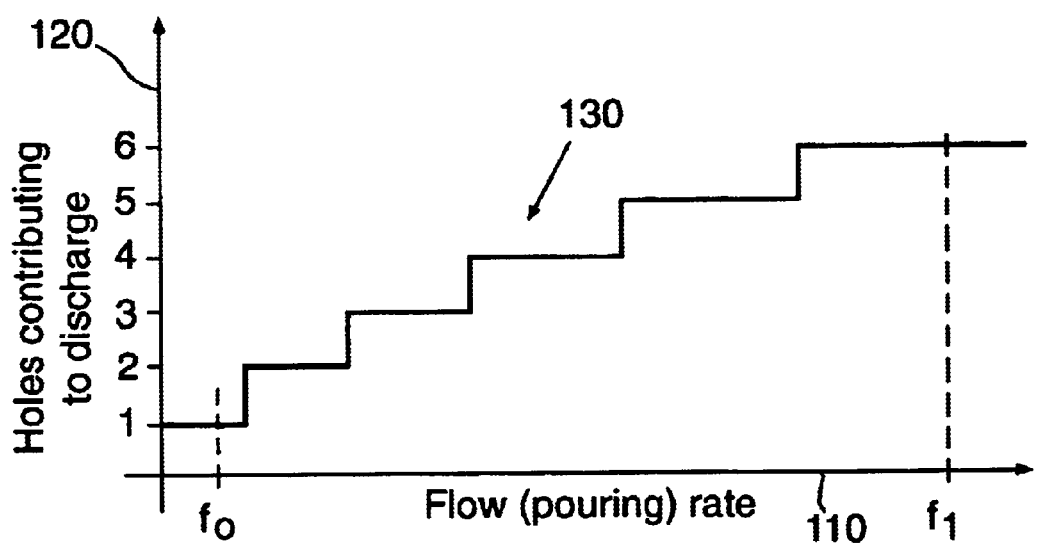
FIG. 2 is a response graph illustrating operation of an analogy to the first embodiment.

FIG. 2 is a response graph illustrating operation of the aforementioned bucket, the graph indicated by 100. The graph 100 includes a horizontal axis 110 corresponding to water flow rate into the bucket, the axis 110 increasing in value from left to right. The graph 100 further includes a vertical axis 120 corresponding to holes contributing to water discharge from the bucket, hole 1 being at the bottom region of the bucket and hole 6 being situated above hole 1 further up towards the top region of the bucket. A stepped curve 130 indicates a relationship between the holes contributing to discharge from the bucket as determinable from the axis 120 for a corresponding water flow rate into the bucket determinable from the axis 110. Thus, at a water flow rate of $f_0$ into the bucket, only hole 1 has water discharging therethrough. Conversely, at a water flow rate of $f_1$ into the bucket, holes 1 to 6 have water discharging therethrough.

It can be seen from the graph 100 that, because the holes increase approximately exponentially from the bottom region of the bucket to the top region thereof, the curve 130 is substantially of logarithmic form. By analogy, on account of binary division occurring within the binary counter 40, the configuration 10 provides a similar characteristic when error rate is plotted with respect to the horizontal axis 110 and "Resulting Output Code" is plotted with respect to the vertical axis 120.

The configuration 10 is a simple embodiment of the invention. In practice, the configuration 10 can be modified to replace the up/down counter 30 with a corresponding counter with more counter bits, to replace the binary counter 40 with a corresponding counter with more counter bits and to replace the multiplexer 50 with a corresponding multiplexer capable having more address bits and capable of multiplexing more inputs to the output Q.

A second embodiment of the invention corresponds to the configuration 10 but modified so that the up/down counter 30 is replaced with a corresponding 8-bit up/down counter 140, the multiplexer 50 is replaced with a corresponding 32-to-1 multiplexer 150, and the 16-bit binary counter 40 is replaced with a corresponding 32-bit binary counter 160. In the second embodiment, only the most significant 5 bits output from the up/down counter 140 are used to control the multiplexer 150 at its address inputs. Reference numbers 140, 150, 160 are used here for clarity but are not included in FIG. 2.

Figure 3:
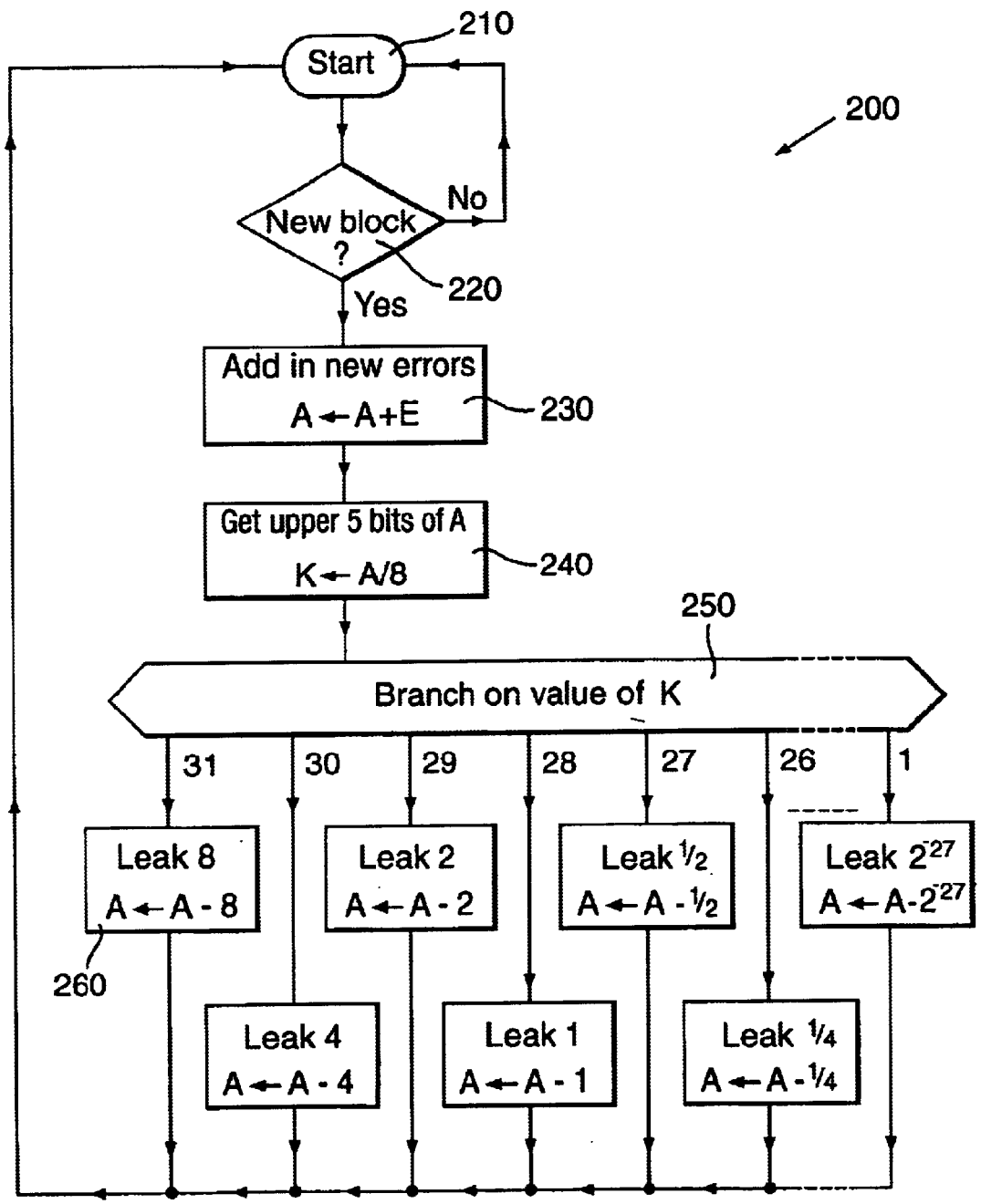
FIG. 3 is a flow diagram illustrating operation of a second embodiment of the invention.

FIG. 3 includes a flow diagram illustrating operation of the second embodiment of the invention, the diagram indicated by 200. The diagram 200 comprises a start function 210 and a new frame function 220 corresponding to operation of the interface unit 20 of the second embodiment. The diagram 200 also comprises an add function 230 corresponding to operation of the up/down counter 140, a symbol A representing an 8-bit count in the counter 140 and a symbol E representing error pulses output at the ERROR output of the interface unit 20. The diagram 200 additionally includes a function 240 implemented in the second embodiment by connecting the five most significant bits of the up/down counter 140 to address inputs of the multiplexer 150; a parameter K corresponds to A divided by 8.

The diagram 200 further comprises a branch function 250 corresponding to operation of the 32-to-1 multiplexer 150 of the second embodiment. Moreover, the diagram 200 includes a number of decrementing functions, for example a function 260, linked in parallel from the function 250 to the function 210. Branching to appropriate decrementing functions from the function 250 depends upon a value of the parameter K. If the parameter K has a relatively high value, for example K=31, then a relatively high rate of decrementing the counter 140 is thereby selected, namely a decrement of 8 counts. Alternatively, if the parameter K has a relatively low value, for example K=1, then a relatively low rate of decrementing the counter 140 is thereby selected, namely a decrement of $2^{-27}$ counts. When K=0, the counter 140 is not decremented. Fractional decrementing, namely A<−A−⅟N performed in the decrementing functions, is implemented by decrementing the counter 140 every $N^{th}$ block of data in the data stream.

The second embodiment of the invention operates according to the diagram 200 incrementing A when errors occur in the data stream passing through the interface unit 20 and decrementing A at a rate determined by current contents of A, thereby providing a logarithmic relationship between A and E, A providing a logarithmic measure of error rate within the data stream. Because of the logarithmic measure, the second embodiment is capable of providing a wide dynamic measuring range of $2^{31}$ for errors occurring in the data stream; the measuring range of $2^{31}$ corresponds to 1 to 2000 million which is a very considerably enhanced range compared to that provided by conventional error rate monitors. Moreover, the configuration 10 and the second embodiment of the invention described above represent simpler circuit arrangements compared to many convention error rate monitors.

The diagram 200 corresponds in form to a flow chart for a computer algorithm. The inventor has appreciated that it is also possible to implement the invention, rather than as hardware shown in FIG. 1, in the form of a high-speed microprocessor capable of sampling the data stream and determining therefrom error count per block of data. When the invention is implemented using software executing in a microprocessor to provide a technical effect of measuring error occurrence over a relatively wide dynamic range, the counters 30, 40, the multiplexer 50, the shift register 60 and the AND gate 70 in the configuration are implemented by memory, registers and accumulators within the microprocessor. Such software implementation of the invention enables the output P to increase in a relationship as the "Resulting Output Code" increase in a manner other than exponentially, for example as a square, cube or quartic of the "Resulting Output Code". However, the invention provides its advantage of enhanced dynamic range only if the rate of decrementing the counter 40, or software equivalent thereof, increases at a rate greater than linearly with respect to increase in the "Resulting Output Code".

It will be appreciated that modifications can be made to embodiments of the invention described above without departing from the scope of the invention. For example, bit-widths of counters and multiplexers, or software equivalents thereof, used in the embodiments can be altered to suit particular error measuring ranges. Moreover, embodiments of the invention can be implemented as single integrated circuits, such circuits being capable of incorporation into communications systems, radio links, computer networks and similar apparatus where considerable data flow occurs and where error monitoring is required. For example, in a communication system incorporating a plurality of communications paths, an error rate monitor according to the invention can be allocated to each path to monitor error rate associated with data streams flowing through the paths. If one of the paths, namely a potentially faulty path, exhibits an error rate at variance with other of the paths, the system can selectively divert data flow away from the potentially faulty path to the other paths, thereby ensuring reliable operation of the system and hence a high standard of service to users of the system.

I claim:

1. An error rate monitor for measuring a rate of error occurrence in a data stream, the monitor comprising:
   a) error detecting means for receiving and analyzing the data stream to identify when errors occur therein;
   b) counting means for counting up errors identified by the error detecting means to provide a cumulative error count; and
   c) decrementing means for decrementing the error count at a rate dependent upon a magnitude of the error count, the decrementing means being operable to decrement the error count at a rate which increases more than linearly with respect to increases in the magnitude of the error count, the error count thereby providing an indication of the rate of error occurrence within the data stream.

2. The monitor according to claim 1, wherein the rate at which the decrementing means decrements the error count increases substantially exponentially with respect to increases in the magnitude of the error count, thereby providing the monitor with a substantially logarithmic response for the error count with respect to the error occurrence in the data stream.

3. The monitor according to claim 1, wherein the data stream is partitioned into data blocks, each block having associated therewith overhead information useable by the error detecting means for determining the error occurrence in the respective block.

4. The monitor according to claim 3, wherein the counting means and the decrementing means are clocked at a rate depending upon a rate of receipt of data blocks at the error detecting means.

5. The monitor according to claim 1, wherein the error detecting means, the counting means and the decrementing means are implemented as processing means executing software.

6. The monitor according to claim 1, wherein the error detecting means includes an assembly of logic gates operable to detect errors in the data stream, wherein the counting means includes an up/down counter for counting errors detected by the error detecting means and for providing a count output, and wherein the decrementing means includes a binary counter and a multiplexer for providing data for use in decrementing the up/down counter depending upon a magnitude of the count output, thereby rendering the count output indicative of the rate of error occurrence in the data stream.

7. The monitor according to claim 6, wherein the up/down counter is a 4-bit up/down counter, wherein the binary counter is a 16-bit binary counter, and wherein the multiplexer is a 16-to-1 multiplexer.

8. The monitor according the claim 6, wherein the count output of the up/down counter is connected to address inputs of the multiplexer for selecting count outputs of the binary counter for use in generating the data for use in decrementing the up/down counter.

9. A communication system including communications paths operable to convey respective data streams, one or more of the paths each including an error rate monitor for monitoring error rate along the respective path, the monitor comprising:
   a) error detecting means for receiving and analyzing the respective data stream to identify when errors occur therein;
   b) counting means for counting up errors identified by the error detecting means to provide a cumulative error count; and
   c) decrementing means for decrementing the error count at a rate dependent upon a magnitude of the error count, the decrementing means being operable to decrement the error count at a rate which increases more than linearly with respect to increases in the magnitude of the error count, the error count thereby providing an indication of the rate of error occurrence within the respective data stream.

10. The system according to claim 9 operable to divert the data streams away from the paths whose associated monitors detect an excess rate of error occurrence.

11. An error rate monitor for measuring a rate of error occurrence in a data stream, the monitor comprising:
   a) error detecting means for receiving and analyzing the data stream to identify when errors occur therein;
   b) counting means for counting up errors identified by the error detecting means to provide a cumulative error count; and
   c) decrementing means for decrementing the error count at a rate dependent upon a magnitude of the error count, the decrementing means being operable to decrement the error count at a rate which increases substantially exponentially with respect to increases in the magnitude of the error count, the error count thereby providing an indication of the rate of error occurrence within the data stream, and also providing the monitor with a substantially logarithmic response.

12. A method of measuring a rate of error occurrence in a data stream, the method comprising the steps of:
   a) receiving and analyzing the data stream to identify when errors occur therein;
   b) counting up identified errors to provide a cumulative error count; and
   c) decrementing the error count at a rate which increases more than linearly with respect to increases in a magnitude of the error count; and
   d) repeating steps a) to c) until monitoring of error occurrence is completed, the error count thereby providing an indication of the rate of error occurrence within the data stream.

13. The method according to claim 12, wherein the rate at which the error count is decremented increases substantially exponentially with respect to increases in the magnitude of the error count.

* * * * *